J. Morton,
Saw Set.
No. 103,359.　　　　　Patented May 24, 1870.
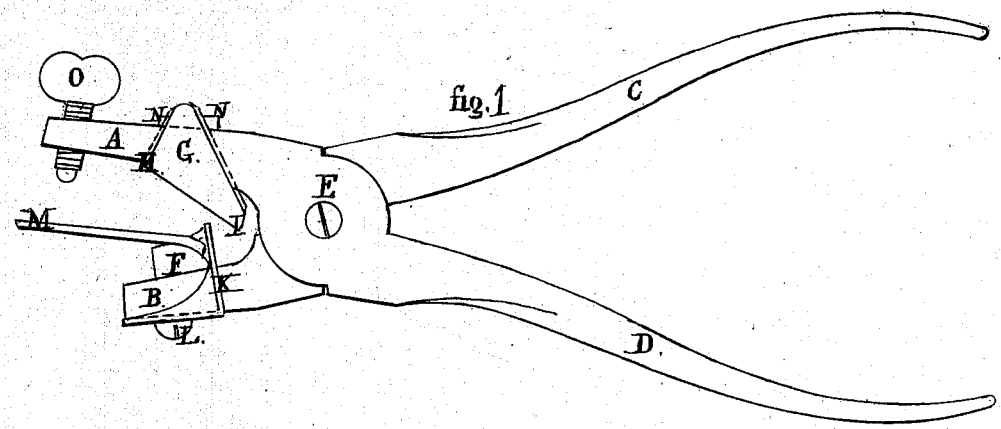
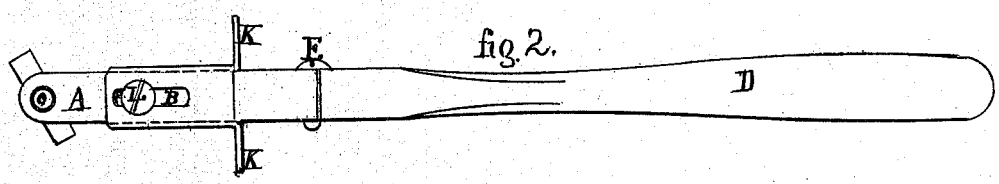
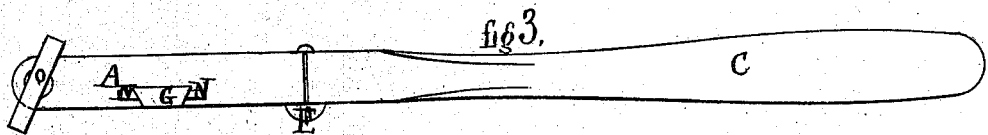
Witnesses:
John B. Devine
Wm. H. Johnson
Inventor:
James Morton

United States Patent Office.

JAMES MORTON, OF PHILADELPHIA, PENNSYLVANIA.

Letters Patent No. 103,359, dated May 24, 1870.

IMPROVEMENT IN SAW-SET.

The Schedule referred to in these Letters Patent and making part of the same.

*To all whom it may concern:*

Be it known that I, JAMES MORTON, of the city and county of Philadelphia and State of Pennsylvania, have invented a certain new and useful Improvement in an implement used for setting the teeth of saws, known in the arts as a Saw-set; and I hereby declare the following to be a full, clear, and exact description thereof, reference being had to the accompanying drawings and letters of reference marked thereon.

The nature of my invention consists in the combination of an anvil or bit of convex-face with an oblique opposing steel bit or set, and connected with a pair of pliers, provided with suitable adjustable guages to adapt it to the size of the teeth of the saw to be set, and the amount of set or lateral bending of the teeth that may be desired, they being so arranged that, when in use, a peculiar drawing motion between the saw-tooth and the oblique bit, renders the correct setting of teeth easy and certain. And, besides this, my invention includes some minor details in its construction.

Figure 1 shows an elevation of this implement.

Figure 2 shows the under side thereof, and

Figure 3 the upper side thereof.

The same letters of reference apply to the same parts in the several figures.

A and B respectively represent the upper and lower jaws of a pair of pliers, having handles C and D, and united by a substantial joint at E.

It is most convenient, although not essential, to have a spring in the joint E, or between the handles C and D, to open the pliers, so that the operator in using them has only to close them.

In the lower jaw B I fasten securely the anvil F, the upper surface of which is a segment of a cylinder of small diameter, having the axis parallel with the axis of the joint E.

Into the side or center of the upper jaw A I insert, in a tapering dovetail, the bit G, the working-face H I of which bit is a plane parallel to the axis of the anvil F, and is a tangent to a circle concentric with the joint E, and of about one-half the radius of the arc in which the bit G moves.

The working-face of the bit G should not be wider than the smallest saw tooth to be set by it. Upon closing the pliers, instead of a simple compression being exerted upon a tooth of the saw M, placed between the anvil F and bit G, a drawing or sliding motion is produced in direction of from H toward I, this tending to draw the saw toward the joint E.

The bit G is retained in the tapering dovetail slot in the jaw A by means of a key, N, passing in a slot or groove in the side of the bit G and resting in the jaw A.

To regulate the distance to which the saw M may, in this manner, be drawn in, I attach an adjustable guage, K K, by means of a screw, L, passing through a slot in K, and screwed into the jaw B, and may thus be adjusted to suit any depth of saw-tooth required.

By means of a thumb-screw, O, passing through the jaw A, and, when in use, bearing upon the saw M, the extent of lateral bending of the saw-teeth, or, as it is technically called by mechanics, the set of the saw, is determined.

It will be readily seen upon inspection, and from the foregoing description, that the saw-teeth are drawn in toward the gauge K without any special care on the part of the workman, and it is found, in practice, that by first springing the tooth down by a drawing movement, and then compressing it, as when the bit and anvil are firmly pressed on the saw-plate, the liability to break the the teeth off is less than with any saw-sets heretofore known.

I do not claim as my invention any of the several elements or parts of my invention, they appearing separately in various contrivances for the same use, but

What I claim as my invention, and desire to secure as such by Letters Patent, is—

The saw-set herein described, consisting of the jaws A B, the convex-anvil F, and oblique-faced bit G, having a drawing movement and provided with gauges, either adjustable or otherwise, as shown and described.

JAMES MORTON.

Witnesses:
 JOHN B. DEVINE,
 WM. F. JOHNSON.